July 21, 1925.

R. STRESAU

SILENT GEAR AND METHOD OF MAKING THE SAME

Filed May 31, 1921

INVENTOR:
Richard Stresau

Patented July 21, 1925.

1,546,418

UNITED STATES PATENT OFFICE.

RICHARD STRESAU, OF WAUWATOSA, WISCONSIN.

SILENT GEAR AND METHOD OF MAKING THE SAME.

Application filed May 31, 1921. Serial No. 473,728.

*To all whom it may concern:*

Be it known that I, RICHARD STRESAU, a citizen of the United States, residing in the city of Wauwatosa, in the county of Milwaukee and State of Wisconsin, have invented a certain new and useful Improvement in Silent Gears and Methods of Making the Same; and I do declare the following to be a clear, exact, and complete description thereof, such as will enable persons skilled in the art to which the invention relates to make and use the same, reference being had to the accompanying drawing as showing constructions in which my invention has been embodied.

My invention relates to a novel construction of laminated spur gears which are silent in operation, and to the method of manufacturing such gears.

The invention is embodied in a gear which is composed of a plurality of superposed or laminated discs each of which is formed as a completed gear section with peripheral teeth, a suitable number of which sections are assembled and permanently secured together in such manner as to constitute a unitary gear structure having a face of the desired width, with the teeth of the gear sections staggered with relation to each other.

I propose to embody my method of making gears in structures for which the complete toothed gear sections are punched from steel plates, and after assembly of the sections are secured together to form the unit with the teeth staggered on the longitudinal surface of the gear, inasmuch as my novel process comprises the construction of gears made up from previously prepared complete toothed sections, which latter are united in sufficient number to form a gear having a face of the desired width. The gist of my invention resides in the plan of producing gear units by assembling a plurality of previously prepared complete gear sections and laminating and connecting such sections so as to produce a unitary gear structure with teeth on the sections staggered or offset on contiguous circumferential lines, in which the usual operations of generating the teeth are avoided, thereby materially reducing the production cost of gears with peripheral teeth.

In the manufacture of my improved gear, the sections are blanked from sheets of steel of suitable gauge, by dies which produce gear sections which are complete in themselves, and which it is not necesary to subject to any further milling operations to effect the formation of the teeth of the gear. The dies which are employed to punch out the gear sections, also produce in each section a central opening of appropriate diameter for the reception of the shaft upon which the gear is to be mounted, and rivet holes if the sections are to be united by means of rivets.

In producing gears with staggered teeth, the pitch lines of the teeth will be divided by the number of sections embodied in the unit of construction, and the teeth of the several assembled sections of the unit will be staggered with relation to the adjacent sections, in accordance with such division and in order that the staggered order of the toothed gear sections may be established, a circular row of rivet holes is provided in each gear section, such holes being preferably equidistant in each section, but varying progressively in each succeeding section with the division of the pitch lines.

In such gears, the relation of the rivet holes to the teeth varying in the several sections, it will be seen that when the holes in the several sections comprising the unit are aligned for the insertion of the rivets, it follows that the teeth of the sections constituting the gear unit are progressively advanced and staggered with relation to each other, so that when riveted together the teeth are set in the order desired and as described.

Thus, I may produce a gear the teeth of which are staggered in circumferential sections, and this is achieved without resort to the usual costly milling operations heretofore attendant upon the production of such gears.

As an alternative construction, I may dispense with the provision of the circular row of rivet holes in each of the gear sections, and instead cut a key seat therein, the location of which will vary in the same manner in its relation to the teeth of the gear sections, and after alignment of the sections by means of the key seat, may unite the sections by spot welding such sections together to constitute a unitary structure.

The novel features residing in my invention will be pointed out in the appended claims.

In the drawing attached to this specification, Figure 1 is a perspective view showing a gear produced in accordance with my invention.

In carrying out my invention, I equip an ordinary blanking press with dies suitably configured to punch from a steel plate, complete gear sections 10 each having finished teeth 11 of the desired pitch. Each gear section is provided with a center opening 12, for the reception of the shaft upon which the gear is mounted. For the purpose of securing the gear sections into a unit, I provide each of them with a circular row of rivet holes 13, which are preferably equally spaced in the circle which they form.

Figure 2:
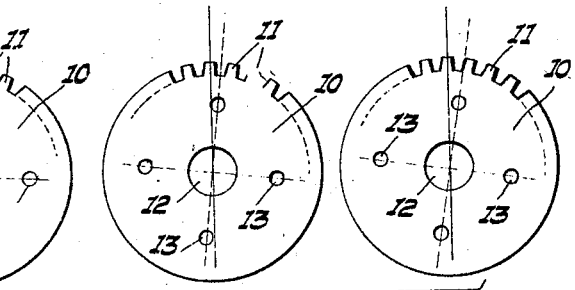
Fig. 2 is a diagram showing the production of gear sections of uniform construction, but in which sections the arrangement of the rivet holes in relation to the teeth of the gear sections is varied, so that when the said holes are aligned for the insertion of the rivets, the teeth of the sections will assume a staggered position with relation to each other.
Figure 3:
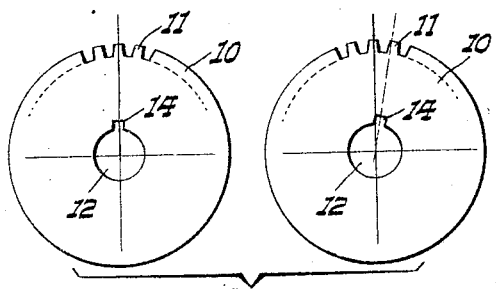
Fig. 3 shows a modification in the method of manufacture, in which a key seat in the gear sections is provided for securing the alignment of the sections with a resultant staggering of the teeth of the gear.
Figure 4:
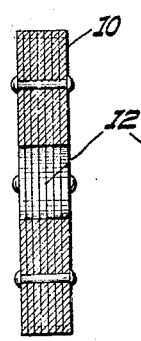
Fig. 4 is a central longitudinal sectional view showing the manner in which the gear sections are connected together by means of rivets.

In producing gears with staggered teeth, the position of the holes in the several gear sections with relation to the teeth of the sections will progressively advance in the manner shown in Fig. 2, wherein the arrangement of such holes in the several blanks is shown as conforming to divisions of the pitch lines of the teeth of the gear sections. To produce this progressive order of the rivet holes, it is necessary that the dies of the press be provided with correspondingly arranged punches, which in the separate dies will bear the necessary relation to the teeth of the gear sections.

Figure 1:
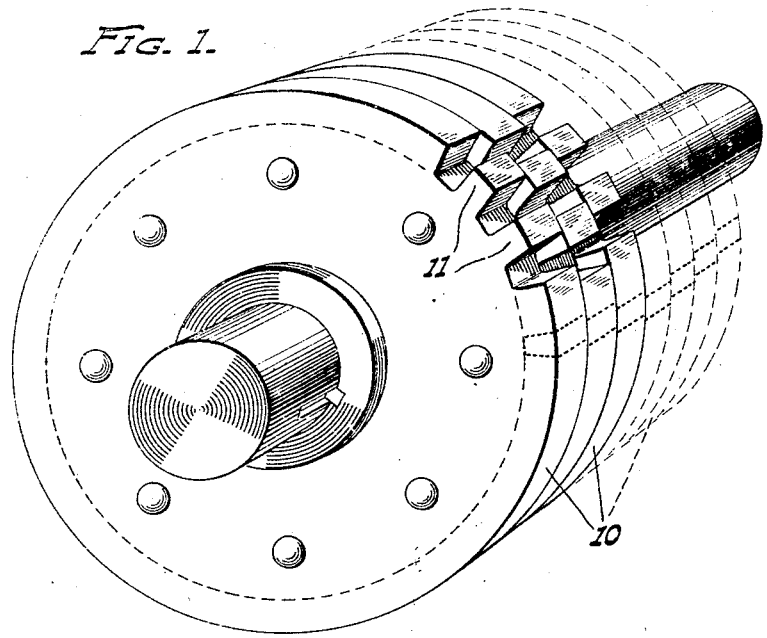

When the several gear sections constituting a unit are assembled by superposing or laminating, with the rivet holes in the several sections aligned for the insertion of the rivets by means of which the sections of the unit are connected together, the teeth of the sections will assume the proper relation with reference to each other. When the rivets are inserted and headed, a gear unit of the construction conventionally shown in Fig. 1 will be produced, which figure shows the teeth of the gear as staggered.

By following the procedure outlined, I have been enabled to produce a silent running gear, and I achieve this very desirable result without resorting to the cutomary practice of generating the teeth by milling.

Thus I produce an efficient gear structure of the class described at a great economy in the cost of manufacture.

I have found that the vibrations incident to the operation of the gear structure may be broken by coating the contiguous sides of the sections with an elastic enamel, the use of which will be contributory to the noiseless running of the gear.

Figure 5:
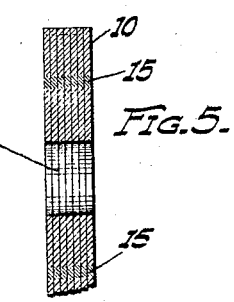
Fig. 5 is a similar view showing such sections as united by spot welding.

As an alternative, I can dispense with the rivet holes 13, in the gear sections, and cut a key seat 14 in the said sections. The position or arrangement of this key seat will vary in its relation to the teeth of the gear in the same manner as previously described. The gear sections constituting the unit will be assembled with the key seats in alignment and thus the staggered effect of the teeth of the gear will be produced. Laminated or superposed sections, not provided with rivet holes, may be united by spot welding, as indicated at 15 in Fig. 5, so that such sections will be connected into a unitary structure as before.

In making a plain spur gear, the teeth of the several component sections may be aligned by any suitable means, in the absence of rivet holes, before welding the sections together.

Having thus described my invention, what I claim and desire to secure by Letters Patent of the United States, is:

1. A laminated silent gear composed of a plurality of gear sections, the teeth of which are staggered with relation to each other, the said sections being coated on their sides with an elastic enamel and secured together to constitute a unitary structure.

2. A laminated silent gear composed of a plurality of gear sections, each coated on their sides with an elastic enamel and provided with aligning means, whereby the teeth of the gear sections are staggered with relation to each other when the said sections are assembled, and means for securing the sections to constitute a gear unit.

3. A laminated silent gear composed of a plurality of sections each coated on their sides with an elastic enamel and provided with teeth and aligning means, the relation of the latter to the teeth varying progressively in the several sections, whereby when alignment of the sections is made the teeth of the sections are staggered with relation to each other in the gear unit.

4. A laminated silent gear composed of a plurality of sections each coated on their sides with an elastic enamel and provided with teeth and rivet holes, the relation of the latter to the teeth varying progressively in the several sections, whereby when rivets are inserted in the aligned holes the teeth of the sections are staggered in the assembled gear unit.

5. The method of manufacturing silent gears, which comprises the steps of blanking in a single operation gear sections each provided with teeth and aligning means, placing an elastic enamel upon the contacting sides of such gear sections, the latter being differently arranged in the several sections with relation to the teeth thereof, assembling the sections by alignment of the means therein provided to effect staggering of the gear teeth, and uniting the sections into a unitary structure with the teeth thereof staggered with relation to each other.

6. The method of manufacturing silent gears, which comprises the steps of blanking in a single operation gear sections each provided with teeth and rivet holes, placing an elastic enamel upon the contacting sides of such gear sections, the latter being progressively arranged in the several sections with relation to the teeth thereof, assembling the sections with the rivet holes in alignment to effect staggering of the gear teeth, and uniting the sections into a unitary structure by means of rivets with the teeth thereof staggered with relation to each other.

In testimony whereof, I have signed my name at Milwaukee, this 27th day of May, 1921.

R. STRESAU.

Witnesses:
W. F. WOOLARD,
W. E. REUSS.